(12) United States Patent
Yu et al.

(10) Patent No.: US 6,947,104 B2
(45) Date of Patent: Sep. 20, 2005

(54) VERTICAL-TYPE BACKLIGHT UNIT HAVING REMOVABLE LAMP MODULE CARTRIDGES

(75) Inventors: Chuan-Pei Yu, I-Lan Hsien (TW); Chin-Kun Hsieh, Hsin-Chu (TW); Han-Chou Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 100 days.

(21) Appl. No.: 10/604,918

(22) Filed: Aug. 26, 2003

(65) Prior Publication Data
US 2004/0239829 A1 Dec. 2, 2004

(30) Foreign Application Priority Data
May 29, 2003 (TW) ........................................ 92114629 A

(51) Int. Cl.⁷ ..................... G02F 1/1335; G02F 1/1333; F21V 7/04; G09G 3/10
(52) U.S. Cl. .............................. 349/61; 349/58; 349/67; 349/70; 349/112; 362/31; 315/169.3
(58) Field of Search ............................. 349/58, 61, 62, 349/64, 67, 70, 112, 113; 315/169.3; 362/26, 31

(56) References Cited
U.S. PATENT DOCUMENTS

| | | | | | |
|---|---|---|---|---|---|
| 6,111,622 | A | * | 8/2000 | Abileah ........................ | 349/61 |
| 6,147,724 | A | * | 11/2000 | Yoshii et al. .................. | 349/62 |
| 6,491,411 | B2 | * | 12/2002 | Itoh ............................ | 362/246 |
| 2003/0026085 | A1 | * | 2/2003 | Ueda et al. ................... | 362/31 |
| 2004/0012763 | A1 | * | 1/2004 | Yu et al. ...................... | 353/122 |
| 2004/0062034 | A1 | * | 4/2004 | Hsieh et al. .................. | 362/97 |
| 2004/0119418 | A1 | * | 6/2004 | Moon ....................... | 315/169.3 |
| 2004/0223313 | A1 | * | 11/2004 | Yu et al. ....................... | 362/31 |
| 2004/0232853 | A1 | * | 11/2004 | Hur et al. .................... | 315/291 |

FOREIGN PATENT DOCUMENTS

JP        11-002813        6/1999

* cited by examiner

Primary Examiner—Tarifur R. Chowdhury
(74) Attorney, Agent, or Firm—Winston Hsu

(57) ABSTRACT

A vertical-type backlight unit for flat panel display apparatuses. The vertical-type backlight unit includes a plurality of lamps installed in a housing in substantially parallel manner. A plurality of reflection plates are combined with corresponding lamps to constitute independent lamp module cartridges, each of which is removable from one side of the housing. A diffusing pad/plate is disposed over the plurality of lamp module cartridges for diffusing light. An optical sheet is optionally provided on the diffusing pad/plate.

4 Claims, 5 Drawing Sheets

VERTICAL-TYPE BACKLIGHT UNIT HAVING REMOVABLE LAMP MODULE CARTRIDGES

BACKGROUND OF INVENTION

1. Field of the Invention

The present invention relates to a vertical-type backlight unit suited for flat display panels, and more particularly, to a vertical-type backlight unit having a plurality of removable lamp module cartridges.

2. Description of the Prior Art

Backlight modules are known as a key component for the liquid crystal displays, which are widely applied to different kinds of products such as digital cameras, notebooks, personal digital assistants (PDAs), mobile phones, vehicle satellite navigation systems, computer monitors, flat panel TVs and so on. Since the liquid crystal displays are passive luminous devices, a back light unit is required for the LCD devices to meet the requirements of night vision and full color imagery. Basically, the back light unit, which is disposed under the display panel, comprises a luminous means and a diffuser for generating light beams and scattering the light beams uniformly to the display panel. According to the position of the luminous means, the back light units are divided into several types, such as the vertical-type back light unit, in which the light source is generated under the display panel, or the edge-type back light unit, in which the light source is projected from the edges. Among all kinds of back light units, since the vertical back light unit generates light beams under the display panel, therefore, the vertical back light units are widely used in large size display panels or those display panels which need high brightness, such as TV sets.

Referring to FIG. 1, it is a cross-sectional view of a vertical back light module 50 according to the prior art. The vertical back light module 50 is disposed under a display panel 12 and comprises a plurality of lamp tubes 14, a diffusing plate 56, and a reflection plate 18. The lamp tubes 14 are arranged in a close chamber 30 defined by the diffusing plate 56 and the subjacent metal reflection plate 18. The reflection plate 18 is utilized for upwardly reflecting the light source generated by the lamp tubes 14 and thereby increase the light use efficiency of the back light module 50. The diffusing plate 56 is employed for scattering the light source to the display panel 12. Typically, the diffusing plate 56 is made of acrylic or propylene carbonate (PC) having a light transmittance of about 50% to 80%. In some cases, a diffusing sheet 20 and an optical film 22 are disposed over the diffusing plate 56. Typically, the diffusing sheet 20, which is made of acrylic or PC, has a higher light transmittance than that of the diffusing plate 56 and has a thickness of about 0.11 mm to 0.15 mm.

However, the above-described prior art vertical backlight unit 50 has a drawback in that it is time-consuming and very inconvenient to change the lamp tubes. When one of the lamp tubes does not function well or becomes out of order, the users have to carefully remove the display panel 12, the diffusing sheet 20, the optical film 22, and then the diffusing plate 56 from the housing with a screw or other like tools to replace it with a new one. Occasionally, some people abandon the whole liquid crystal display device that only has one or two lamp tubes out of order because they don't know how to change the lamp tubes. In light of the foregoing, it becomes apparent that there is a need for an improved vertical backlight unit module that is convenient for the users to change lamp tubes when some of which are out of order.

SUMMARY OF INVENTION

It is therefore one object of the present invention to provide a vertical type backlight unit having a plurality of independent lamp module cartridges, each of which is removable from one side of the LCD housing.

According to one preferred embodiment of the present invention, a vertical-type backlight unit comprises a plurality of lamp tubes arranged in parallel within a housing, a plurality of reflection plates disposed underneath each of the plurality of lamp tubes and each of the reflection plates being integrated with corresponding lamp tubes to constitute an independent lamp module cartridge, which is removable from one side of the housing, and a diffusing plate disposed over the plurality of lamp tubes and fixed on the housing, the diffusing plate being used to scattering the light generated by the plurality of lamp tubes.

It is advantageous to use the present invention because users can easily change a broken lamp tube directly from one side of the panel housing manually. The present invention provides time-effective and convenient lamp tube changing mechanism. The users don"t even need a screw or other tools to change the lamp tubes.

Other objects, advantages, and features of the present invention will become more clearly and readily apparent from the following detailed description when taken in conjunction with the accompanying drawings.

DETAILED DESCRIPTION

Figure 1:
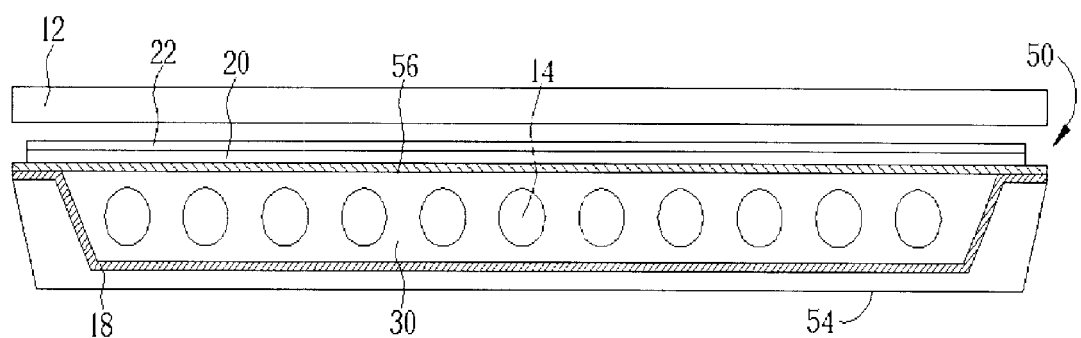
FIG. 1 is a cross-sectional view of a vertical back light module according to the prior art.
Figure 2:
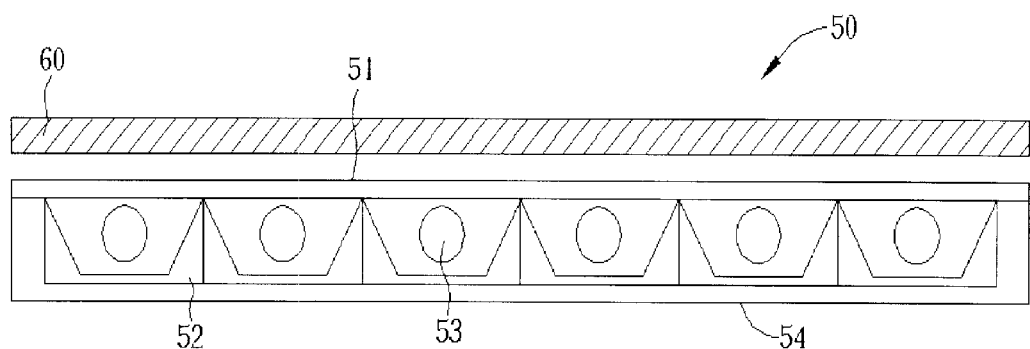
FIG. 2 is a cross-sectional view showing the backlight unit according to the first preferred embodiment of the present invention.
Figure 3:
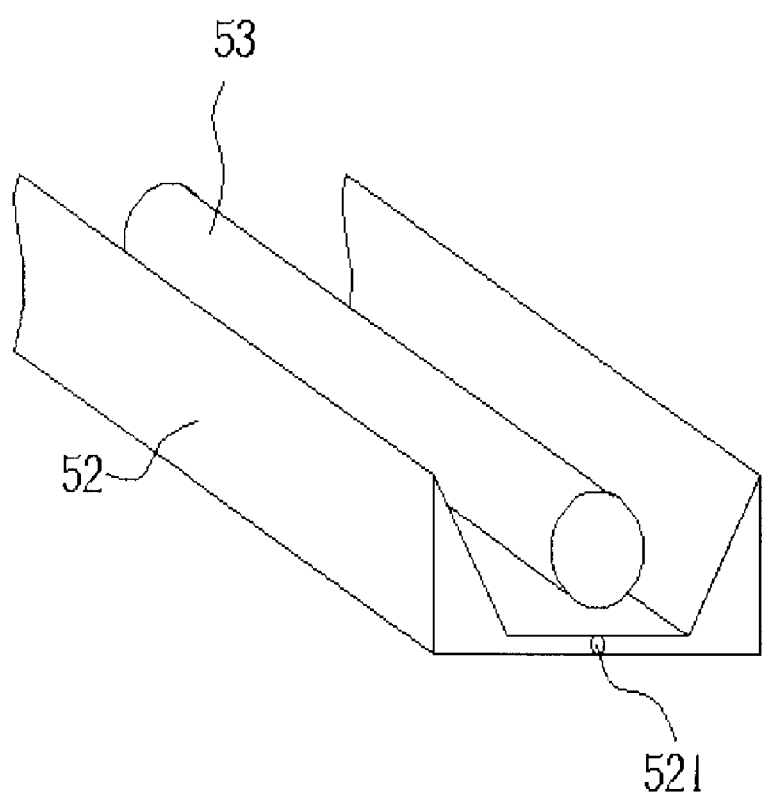
FIG. 3 is a schematic oblique view showing a single lamp module cartridge of FIG. 2 according to the first preferred embodiment of the present invention.

FIG. 2 is a cross-sectional view showing the backlight unit 50 according to the first preferred embodiment of the present invention. FIG. 3 is a schematic oblique view showing a single lamp module cartridge of FIG. 2 according to the first preferred embodiment of the present invention. As shown in FIG. 2, a vertical backlight unit 50 is installed underneath a flat panel 60 such as an LCD flat panel. The backlight unit 50 comprises a housing 54, a diffusing pad or diffusing plate 51 fixed on the housing 54, a plurality of reflection slots 52, and a plurality of lamp tubes 53 disposed in corresponding reflection slots 52. Each of the plurality of lamp tubes 53 is integrated with each of corresponding reflection slots 52 constitute a lamp module cartridge, as indicated in FIG. 3. The lamp module cartridge can be removed or changed independently from one side of the housing 54 without the need of removing the flat panel or reflection optical components. The reflection slot plates 52 are made of U-shaped metal plates having similar size. A through hole 521 is located in the metal plate for accommodating a wiring line (not shown).

The lamp tubes 53 may be cold cathode fluorescent lamps (CCFL) arranged in corresponding chambers defined by the diffusing plate 51 and the plurality of reflection slot plates 52. Each of the reflection slot plates 52 has a flat bottom surface and two oblique reflection walls. Preferably, the reflection slot plates 52 are made of aluminum metal or alloys, foamed PET, or PC resins, but not limited thereto. The diffusing plate 51 is made of poly (methyl methacrylate) (PMMA), propylene carbonate, PET polyester, or the like. According to the preferred embodiment of this invention, the diffusing plate 51 is made of PMMA and has a thickness of few millimeters. Optionally, an optic film (not shown) comprising a diffusing sheet, a prism sheet, and a polarization transmission/reflection sheet may be disposed on the top of the diffusing plate 51.

Figure 4:
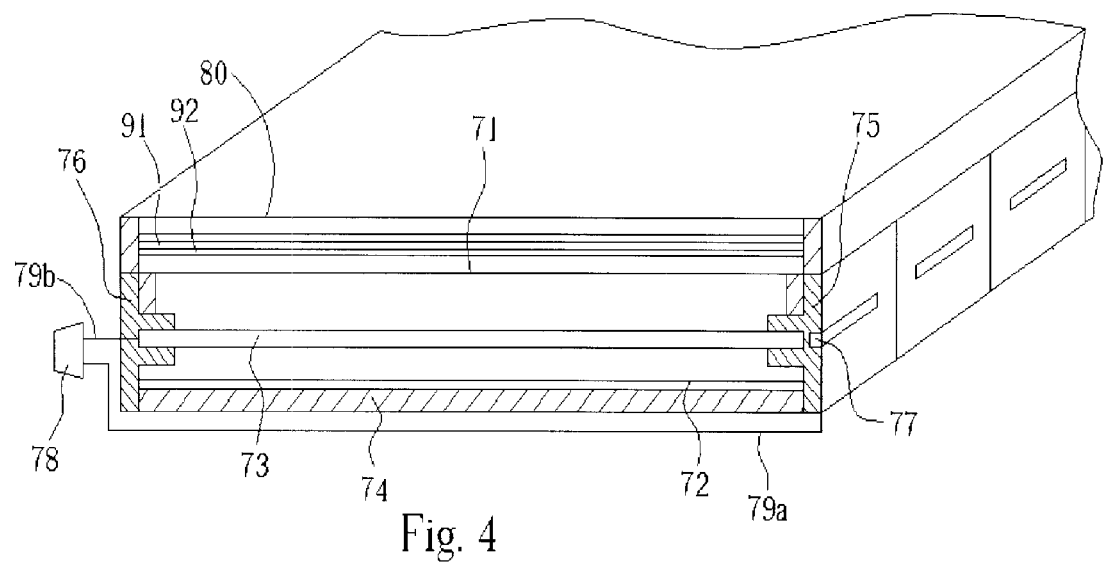
FIG. 4 is schematic cross-sectional view showing a vertical backlight unit according to the second preferred embodiment of the present invention.
Figure 5:
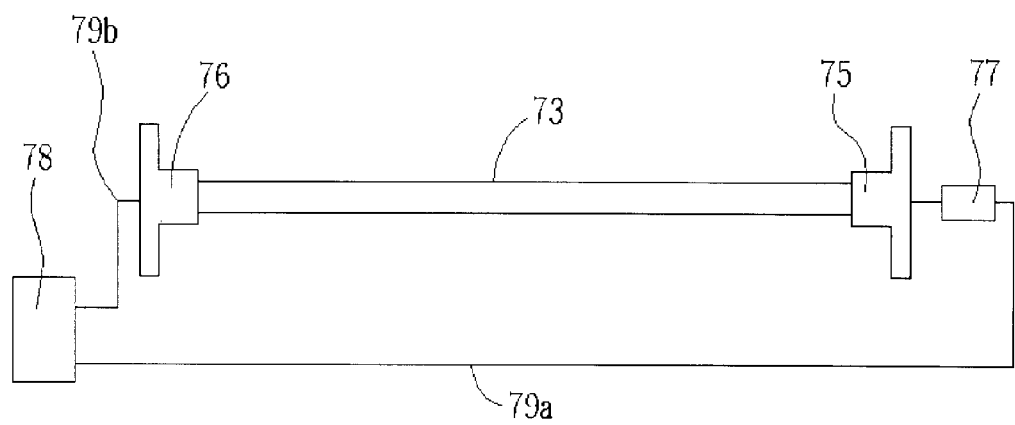
FIG. 5 is a schematic diagram showing the independent lamp module according to the present invention.

Referring to FIG. 4, it is a schematic cross-sectional view showing a vertical backlight unit 70 according to the second preferred embodiment of the present invention. FIG. 5 is a schematic diagram showing the independent lamp module according to the present invention. As shown in FIG. 4, likewise, the vertical backlight unit 70 is installed underneath the flat panel 80. The backlight unit 70 comprises a housing 74, a diffusing plate 71 fixed on the housing 74, a flat reflection plate 72, and a plurality of lamp tubes 73 arranged in parallel manner between the reflection plate 72 and the diffusing plate 71. Each of the plurality of lamp tubes 73 is integrated with the housing 74 to become an independent and removable lamp module. The lamp module design enables a user to change lamp tubes that are out of order independently from one side of the housing 74 without affect other well functioning lamp tubes. As shown in FIG. 4, the lamp tube 73 has one low-voltage end connected to a first plastic capping piece 75 and one high-voltage end connected to a second plastic capping piece 76. The first plastic capping piece 75 and the second plastic capping piece 76 may be made of silicon rubber or other silicone-like materials and are removably embedded at opposite sidewalls of the housing 74. A low-voltage end connector 77 having therein a terminal (not shown) is installed in the first plastic capping piece 75. The low-voltage end of the lamp tube 73 is electrically connected to the terminal in the low-voltage end connector 77 from the rear side of the first plastic capping piece 75. A high-voltage end connector 78 is electrically connected to the low-voltage end connector 77 through a first wiring line 79a. The high-voltage end connector 78 is electrically connected to the high-voltage end of the lamp tube 73 through a second wiring line 79b. When the lamp tube 73 is out of order, the user can unplug the low-voltage end connector 77 and disconnect the low-voltage end connector 77 from the low-voltage end of the broken lamp tube 73. Then, the first and second plastic capping pieces 75 and 76 are removed to change the lamp tube 73.

In accordance with the second preferred embodiment of this invention, the lamp tubes 73 may be cold cathode fluorescent lamps (CCFL) arranged in a chamber defined by the diffusing plate 71 and the reflection plate 72. The reflection plate 72 has a flat bottom surface and is made of aluminum metal or alloys, foamed PET, or PC resins, but not limited thereto. The diffusing plate 71 is made of poly (methyl methacrylate) (PMMA), propylene carbonate, PET polyester, or the like. According to the second preferred embodiment of this invention, the diffusing plate 71 is made of PMMA and has a thickness of few millimeters. Optionally, an optic film 91 and a diffusing sheet 92 may be disposed on the top of the diffusing plate 71.

It is advantageous to use the present invention because users can easily change a broken lamp tube directly from one side of the panel housing manually. In addition, the present invention provides time-effective and convenient lamp tube changing mechanism. The users don''t even need a screw or other tools to change the lamp tubes.

Those skilled in the art will readily observe that numerous modifications and alterations of the present invention method may be made while retaining the teachings of the invention. Accordingly, the above disclosure should be construed as limited only by the metes and bounds of the appended claims.

What is claimed is:

1. A backlight unit, comprising:
   a plurality of lamp tubes arranged in parallel within a housing; wherein each of the lamp tubes has one low-voltage end connected to a first plastic capping piece and one high-voltage end connected to a second plastic capping piece; wherein a first connector is installed at a rear side of the first plastic capping piece and has a terminal therein to electrically connect to the low-voltage end of the lamp tube; wherein the first connector is electrically connected to a second connector through a first wiring line, and the second connector is electrically connected to the high-voltage end of the lamp tube through a second wiring line;
   a plurality of reflection plates disposed underneath each of the plurality of lamp tubes and each of the reflection plates being integrated with corresponding lamp tubes to constitute an independent lamp module cartridge, which is removable from one side of the housing; and
   a diffusing plate disposed over the plurality of lamp tubes and fixed on the housing, the diffusing plate being used to scatter the light generated by the plurality of lamp tubes.

2. The backlight unit of claim 1, wherein the lamp tubes are cold cathode fluorescent lamps.

3. The backlight unit of claim 1, further comprising an optic film disposed on the diffusing plate, and the optic film comprising a diffusing sheet, a prism sheet, and a polarization transmission/reflection sheet.

4. The backlight unit of claim 1, wherein the first plastic capping piece is embedded on a first sidewall of the housing and the second plastic capping piece is embedded on a second sidewall opposite to the first sidewall of the housing.

* * * * *